United States Patent
Rüdel et al.

(10) Patent No.: US 10,139,112 B2
(45) Date of Patent: Nov. 27, 2018

(54) ANNULAR COMBUSTION CHAMBER OF A GAS TURBINE AND GAS TURBINE WITH SUCH A COMBUSTION CHAMBER

(71) Applicant: ALSTOM Technology Ltd, Baden (CH)

(72) Inventors: Uwe Rüdel, Baden-Rütihof (CH); Urs Benz, Gipf-Oberfrick (CH); Christoph Appel, Umiken (CH); Ivan Lenuzzi, Karlovac (HR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/727,977

(22) Filed: Jun. 2, 2015

(65) Prior Publication Data

US 2015/0354826 A1  Dec. 10, 2015

(30) Foreign Application Priority Data

Jun. 5, 2014  (EP) .................................... 14171370

(51) Int. Cl.
| | |
|---|---|
| F02C 1/00 | (2006.01) |
| F23R 3/50 | (2006.01) |
| F23R 3/16 | (2006.01) |
| F02C 3/04 | (2006.01) |
| F02C 3/14 | (2006.01) |
| F02C 7/18 | (2006.01) |
| F23R 3/60 | (2006.01) |

(Continued)

(52) U.S. Cl.
CPC .................. *F23R 3/50* (2013.01); *F02C 3/04* (2013.01); *F02C 3/14* (2013.01); *F02C 7/18* (2013.01);
(Continued)

(58) Field of Classification Search
CPC .... F23R 3/50; F23R 3/60; F23R 3/002; F23R 2900/03044; F23R 2900/03041; F05D 2260/201
See application file for complete search history.

(56) References Cited

U.S. PATENT DOCUMENTS

| | | | |
|---|---|---|---|
| 4,555,901 A | | 12/1985 | Wakeman et al. |
| 5,333,443 A | * | 8/1994 | Halila ..................... F23R 3/002 60/752 |

(Continued)

FOREIGN PATENT DOCUMENTS

| | | |
|---|---|---|
| EP | 0 387 123 A1 | 9/1990 |
| EP | 1 767 835 A1 | 3/2007 |

(Continued)

*Primary Examiner* — Gerald L Sung
(74) *Attorney, Agent, or Firm* — Ernest G. Cusick; Frank A. Landgraff

(57) ABSTRACT

The invention relates to an annular combustion chamber of a gas turbine having a machine axis. The combustion chamber includes at least two zones. A first zone receives the fuel/air mixture of a plurality of burners. A second zone guides the hot gases being produced by the burners from the first zone to an entrance of a turbine section of said gas turbine. An annular transition liner includes a plurality of liner segments located at the transition between said first zone and second zone. Each of the liner segments includes with respect to the axial hot gas flow a leading edge, a trailing edge, and two sidewalls, and is provided with axial mounting means at the leading and trailing edges, such that the liner segment can be installed in axial direction and is axially fixed by respective segments of the neighboring first zone. Local spacer ribs are provided at the leading edge of the liner segments in order to establish a gap of minimum width between the liner segments and the fixing segments of the neighboring first zone.

10 Claims, 4 Drawing Sheets

(51) Int. Cl.
 *F23R 3/00* (2006.01)
 *F23R 3/48* (2006.01)
 *F01D 9/02* (2006.01)

(52) U.S. Cl.
 CPC ............... *F23R 3/002* (2013.01); *F23R 3/16* (2013.01); *F23R 3/48* (2013.01); *F23R 3/60* (2013.01); *F01D 9/023* (2013.01); *F05D 2220/32* (2013.01); *F05D 2240/35* (2013.01); *F05D 2260/201* (2013.01); *F05D 2260/30* (2013.01); *F23R 2900/03041* (2013.01); *F23R 2900/03044* (2013.01); *Y02E 20/16* (2013.01)

(56) References Cited

U.S. PATENT DOCUMENTS

| 5,363,643 A * | 11/1994 | Halila | F23R 3/002 |
| | | | 60/752 |
| 6,029,455 A * | 2/2000 | Sandelis | F23R 3/002 |
| | | | 60/752 |
| 2003/0047878 A1 * | 3/2003 | Bolms | F01D 11/08 |
| | | | 277/359 |
| 2004/0011059 A1 * | 1/2004 | Tiemann | F23R 3/005 |
| | | | 60/804 |
| 2004/0074239 A1 * | 4/2004 | Tiemann | F23M 5/02 |
| | | | 60/798 |
| 2004/0123598 A1 * | 7/2004 | Ackermann | F23M 5/00 |
| | | | 60/752 |
| 2004/0146399 A1 * | 7/2004 | Bolms | F01D 25/12 |
| | | | 415/175 |
| 2005/0241314 A1 | 11/2005 | Takaya et al. | |
| 2015/0176843 A1 * | 6/2015 | Garry | F23M 5/04 |
| | | | 60/753 |

FOREIGN PATENT DOCUMENTS

| EP | 2 282 124 A1 | 2/2011 |
| EP | 2 728 255 A1 | 5/2014 |
| WO | 2008/017551 A2 | 2/2008 |

* cited by examiner

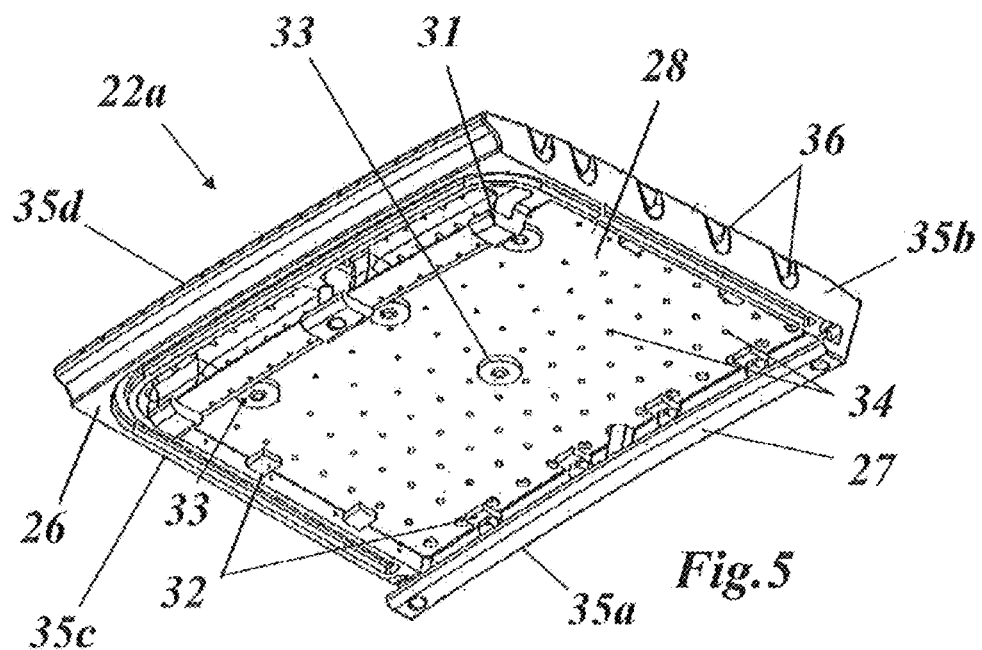
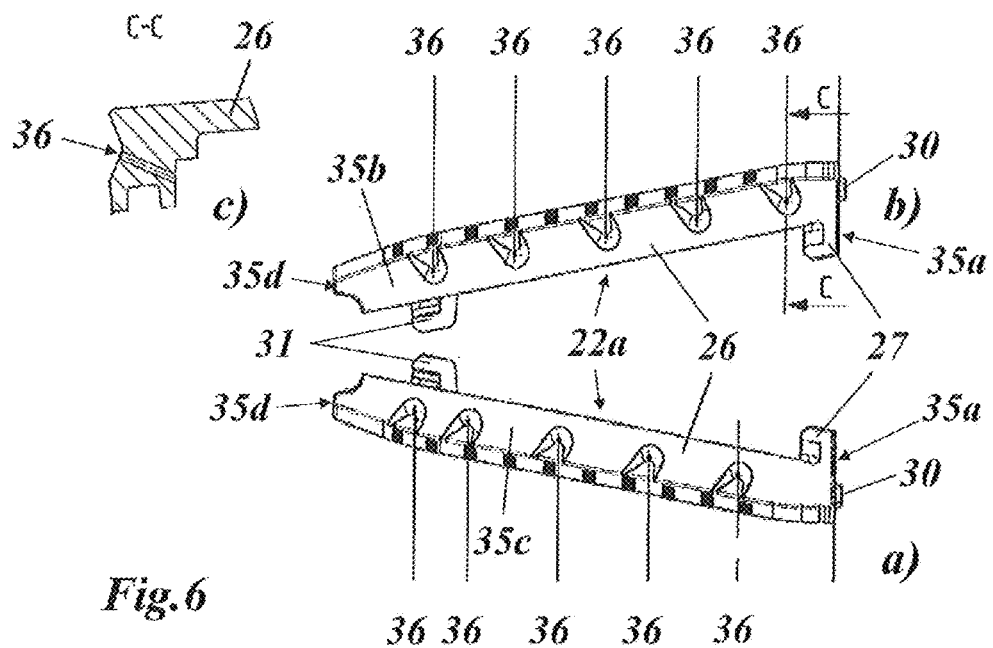

ANNULAR COMBUSTION CHAMBER OF A GAS TURBINE AND GAS TURBINE WITH SUCH A COMBUSTION CHAMBER

CROSS-REFERENCE TO RELATED APPLICATIONS

This application claims priority to European application 14171370.1 filed Jun. 5, 2014, the contents of which are hereby incorporated in its entirety.

TECHNICAL FIELD

The present invention relates to the technology of gas turbines. It refers to an annular combustion chamber of a gas turbine according to the preamble of claim 1.

It further refers to a gas turbine with such an annular combustion chamber.

BACKGROUND

Industrial gas turbines like the GT13E2 of the applicant shown in FIG. 1 in a perspective view are successfully operated for years in power plants with or without combined cycles all over the world. The gas turbine 10 of FIG. 1 comprises a rotor 12, which rotates around a machine axis A. Arranged along the machine axis A the gas turbine 10 is provided with a compressor 14 in a casing 13, a combustor 15, 17 and a turbine section 16.

The compressor 14 compresses air, which enters the machine at an air inlet 11. The compressed air is mixed with a fuel and the mixture is introduced into an annular combustion chamber 15 of the combustor and burnt by means of a plurality of circumferentially distributed burners 17. The resulting hot gas enters the turbine section 16 and drives the machine.

The combustion chamber 15, which is known from document EP 2 282 124 A1, is shown in FIG. 2 in a sectional view. The annular combustion chamber 15 of FIG. 2 is subdivided into two zones 18 and 19. The first zone 18 receives the burning air/fuel mixture of the burners 17, which open into the combustion chamber at the upstream side. The second zone 19 guides the hot gases being produced by burners 17 from said first zone 18 to an entrance of turbine section 16 of gas turbine 10.

The first zone 18 of the combustion chamber 15 is concentrically surrounded by an annular outer liner 20, and concentrically surrounds an inner liner 21. The outer liner 20 is composed of individual segments 23, which are arranged in axial direction in different rows 1 to 3. The inner liner 21 is also composed of individual segments 21a-c, which are arranged in axial direction in different rows 1 to 3. At the transition between first zone 18 and second zone 19 there is provided a transition liner 22, which is also composed of individual liner segments.

Regarding this transition liner 22, there are several problems to be solved:

In order to maintain a required film cooling for the segments of the transition liner, the axial gap between its segments and the neighboring segments 21c of the first zone 18 has to be maintained at a minimum width during hot conditions.

The cooling of the segments must be sufficient.

The duration assembly and disassembly of the segments of transition liner 22 has to be minimized to reduce maintenance time.

Other prior art documents, for example U.S. Pat. No. 4,555,901 A, describe combustion chambers, which do not show two zones, with a first zone receiving the fuel/air mixture of a plurality of burners, and a second zone guiding the hot gases being produced by said burners from said first zone to an entrance of a turbine section of said gas turbine. Consequently, there is no liner segment being part of an annular transition liner located at the transition between said first zone and second zone.

Document WO 2008/017551 A2 discloses a combustion chamber, but fails to teach an annular transition liner located at the transition between a first zone and a second zone. Additional prior art is described in documents EP 1 767 835 A1, EP 2 728 255 A1 and EP 0 387 123 A1.

SUMMARY

It is an object of the present invention to provide an annular combustion chamber, which avoid the disadvantages of the prior art liners and allow a quick assembly and disassembly, combined with improved thermal properties.

It is another object of the invention to provide a gas turbine with such a combustion chamber.

These and other objects are obtained by an annular combustion chamber according to claim 1 and a gas turbine according to claim 11.

The annular combustion chamber of a gas turbine having a machine axis, said combustion chamber comprising at least two zones, whereby a first zone receives the fuel/air mixture of a plurality of burners, and a second zone guides the hot gases being produced by said burners from said first zone to an entrance of a turbine section of said gas turbine, whereby an annular transition liner comprising a plurality of liner segments is located at the transition between said first zone and second zone, whereby each of said liner segments comprises with respect to the axial hot gas flow a leading edge, a trailing edge, and two sidewalls, and that said liner segment is provided with axial mounting means at said leading and trailing edges such that said liner segment can be installed in axial direction and is axially fixed by respective segments of the neighboring first zone.

It is characterized in that local spacer ribs are provided at the leading edge of said liner segment in order to establish a gap of minimum width between said liner segment and said fixing segments of the neighboring first zone.

According to an embodiment of the invention said axial mounting means comprises axially oriented hooks for axially hooking said liner segment in respective carriers provided below said transition liner.

According to a further embodiment of the invention said leading edge and trailing edge of said liner segment are designed such that a purge air flow from a neighboring upstream segment is directed onto an area to be cooled of the downstream segment in order to minimize the interaction between said purge air flow and said hot gas flow.

According to just another embodiment of the invention at the sidewalls of said liner element cooling holes are provided for cooling and/or purging said sidewalls and a gap in circumferential direction between adjacent sidewalls of neighboring liner segments.

According to a further embodiment of the invention said liner segment is provided on its inner side with impingement cooling means.

Specifically, said impingement cooling means comprises an impingement sheet with a plurality of impingement holes distributed in a predetermined pattern over the area of said impingement sheet, whereby said impingement sheet is mounted parallel to the inner wall of the body of said liner segment in a predetermined distance.

More specifically, the pattern and diameter of said impingement holes in said impingement sheet is correlated with an effusion cooling on the hot gas side of said liner segment such that with increasing impact of an effusion cooling film on said hot gas side of said liner segment the diameter and distribution density of said impingement holes decreases.

Even more specifically, said effusion cooling film on said hot gas side of said liner element is effected by a plurality of effusion cooling holes, which are distributed in a predetermined pattern over said hot gas side of said liner element.

Furthermore, said effusion cooling holes on said hot gas side of said liner segment may have various orientations along a longitudinal and transverse axis of said liner segment to allow for a more effective cooling in the outer region of said liner segment.

According to a further embodiment of the invention the hot gas side of said liner segment is coated with a thermal barrier coating (TBC) in order to allow a reduction of the coolant mass flow, thereby leading to a more efficient overall cooling air distribution and in turn to a favorable emission performance of the gas turbine.

The gas turbine of the invention comprises a compressor, a combustor with an annular combustion chamber with a plurality of burners, and a turbine section, whereby said annular combustion chamber has a segmented annular outer liner and a segmented annular inner liner.

It is characterized in that said annular combustion chamber is a combustion chamber according to the invention.

BRIEF DESCRIPTION OF THE DRAWINGS

The present invention is now to be explained more closely by means of different embodiments and with reference to the attached drawings.

FIG. 5-8 show in different perspective views a single liner segment of the transition liner of FIG. 4, with an impingement sheet mounted (FIG. 5), showing cooling holes for the sidewalls (FIG. 6), without the impingement sheet (FIG. 7), and showing the spacer ribs (FIG. 8).

DETAILED DESCRIPTION

Figure 3:
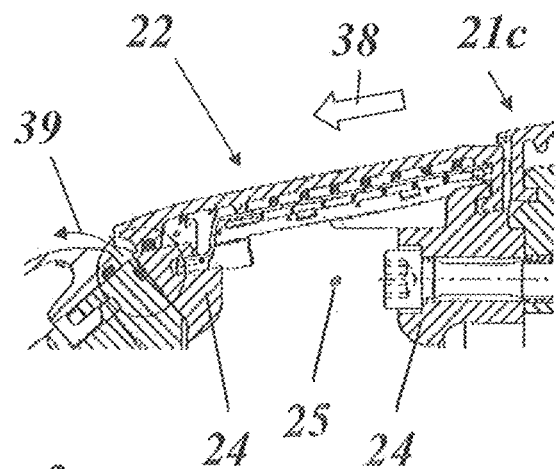
FIG. 3 shows in a magnified view the transition liner and liner segment of the combustor according to FIG. 2 in accordance with an embodiment of the invention.
Figure 4:
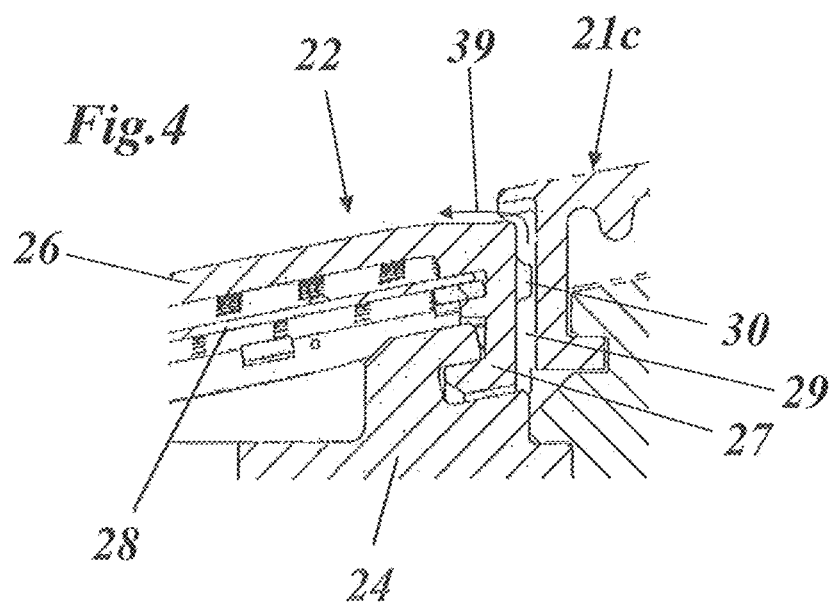
FIG. 4 shows in even more magnified view particulars of the transition liner and liner segment of FIG. 3.

As shown in FIGS. 3 and 4, the transition liner 22 and its liner segments 22a (FIG. 5-8) are arranged between liner segments 21c of the third row of segments of the first zone 18 and the liner of the second zone 19. The liner segments are hooked in axial direction by means of hooks 27, 31 into respective carriers 24. Local spacer ribs 30 at the upstream side of the liner segments 22a define a gap 29 with a minimum width between liner segments 22a and the neighboring segments 21c of the inner liner 21 of the first zone (zone 1) 18.

Figure 1:
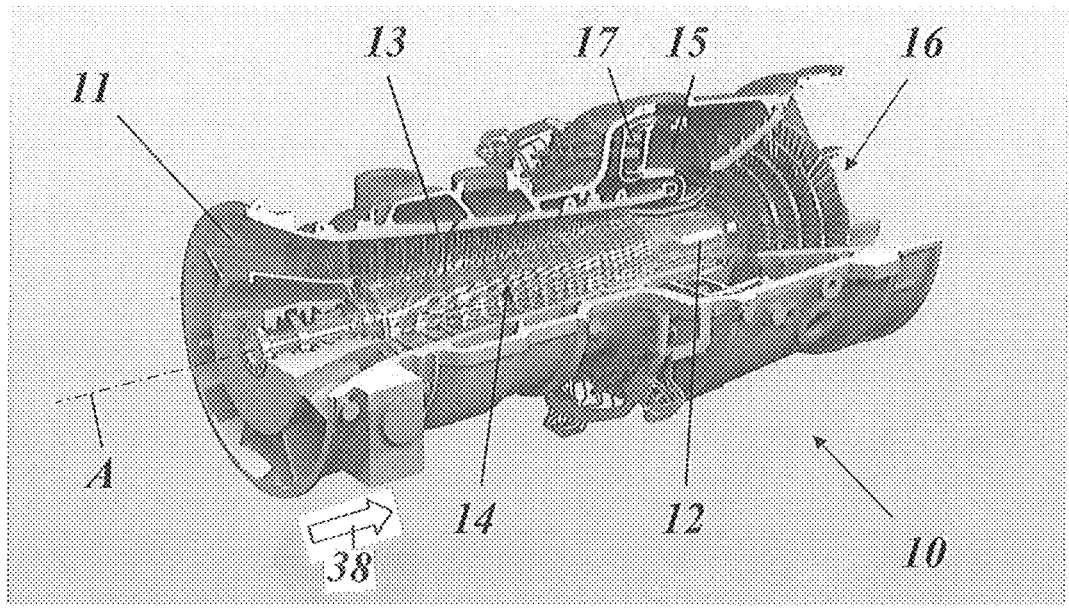
FIG. 1 shows in s perspective view an industrial gas turbine of the type GT13E2 of the applicant (prior art)
Figure 2:
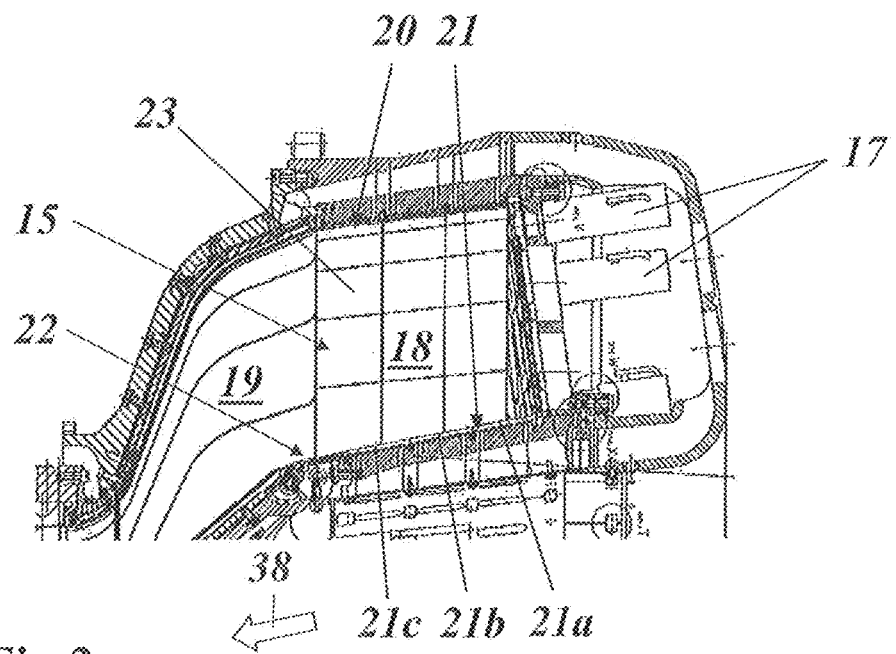
FIG. 2 shows a sectional view of the combustor of the gas turbine according to FIG. 1 (prior art)

The installation of the segments 22a in axial direction, which essentially coincides with the flow direction of the hot gas flow 38 (FIG. 2, 3), ensures the axial fixation through the neighboring zone 1 segments 21c, which in turn are mounted in circumferential direction. There is no free-to-move form fit between the carriers 24 and the liner segments 22a; individual liner segments 22a can be removed if the corresponding zone 1 segment 21c (axial fixation) is disassembled and shifted on the circumference. This results in a reduction of the outage time of the gas turbine during assembly or disassembly.

Figure 8:
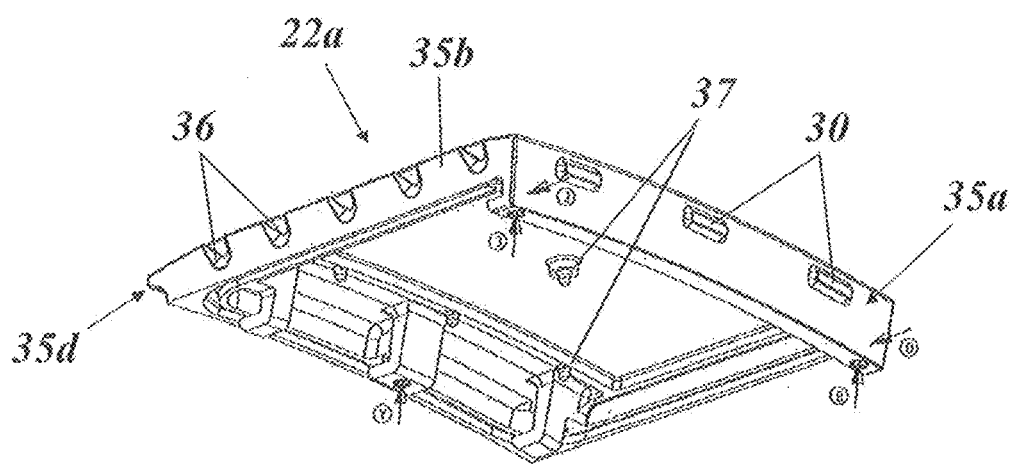

In axial direction, the width of the gap to the neighboring zone 1 segment 21c is being maintained through (in this embodiment: three) local spacer ribs 30 (FIG. 8).

During hot operation this maintains the minimum gap to provide the required cooling of the liner segment 22a. The local spacer ribs 30 also serve as additional axial fixation.

The vertical bolting of the carriers 24 by means of a fixation diameter allows for the gap of two neighboring segments (e.g. 22a, 21c) in radial direction to remain unchanged, also during hot operation and in the range of the manufacturing tolerances of the segment's hooks 27 and 31. The opening 25 formed within the carrier 24 serves as a plenum for the air feed to the segment 22.

Liner segment 22a comprises with respect to axial hot gas flow 38 a leading edge 35a, a trailing edge 35d, and two sidewalls 35b, 35c (see for example FIG. 5). The leading and trailing edge 35a, 35d of the segments are designed such that the purge air flow 39 (FIGS. 3 and 4) from the upstream segment is being 'directed' onto the to-be-cooled area of the downstream segment so that the interactions between the purge air flow 39 and the hot gas flow 38 are minimized.

Since the cooling of the liner segment 22a already represents the second stage of the combustor cooling, the air for the cooling as well as for the purge of the segment sidewalls 35b, 35c (i.e. the gap between the liner segments 22a in circumferential direction) is taken off upstream an impingement cooling, so that the full pressure drop is available. At the sidewalls 35b, 35c of liner element 22a a row of respective cooling holes 36 (FIG. 6; FIG. 6c) are provided for supplying said cooling air to the gap. The exit area of the cooling holes 36 has been designed to maintain a cooling effect also on the side wall of the neighboring segment and irrespective of the gap size between the two neighboring segments. A similar principle was described in EP 2 728 255 A1, filed by the same applicant.

Figure 7:
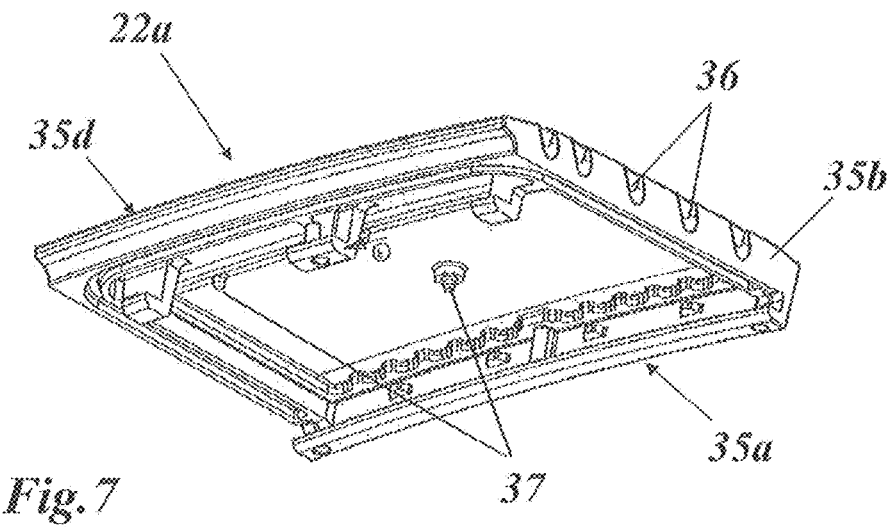

As shown in FIG. 5, that liner segment 22a is provided on its inner side with impingement cooling means in form of an impingement sheet 28 with a plurality of impingement holes 34 distributed in a predetermined pattern over the area of said impingement sheet 28. Impingement sheet 28 is mounted parallel to the inner wall of the body 26 of liner segment 22a in a predetermined distance by means of supporting posts 37, distributed support noses 32 at the sides, and fixing elements 33 (FIGS. 5, 7 and 8).

The arrangement of the holes 34 in the impingement sheet 28 is carefully matched to that of effusion cooling holes on the hot gas side of the liner segments 22a (not shown in the Figures) so that with increasing impact of the effusion cooling film on the segment's hot gas side the holes 34 in the impingement sheet 28 get smaller in diameter and are arranged less densely (FIG. 5).

The effusion holes on the hot gas side of liner segment 22a have various orientations along the longitudinal and transverse axis of the segment to allow for a more effective cooling in the outer region of the segment. An optimization of the interactions between the hot gas 38, the burner type and subsequently the temperature profile at the inlet to the turbine is possible through the adequate selection of the orientation of the effusion holes along the longitudinal axis.

A coating of the liner segment with a thermal barrier coating (TBC) according to the art allows the reduction of the coolant mass flow which leads to a more efficient overall cooling air distribution and in turn to a favorable emission performance of the combustor.

The invention claimed is:

1. An annular combustion chamber of a gas turbine having a machine axis, said combustion chamber comprising: a segmented outer liner and a segmented inner liner defining a first zone that receives a fuel/air mixture from a plurality of burners; a second zone that guides an axial flow of hot gases produced by said burners from said first zone to an entrance of a turbine section of said gas turbine; an annular transition liner comprising a plurality of transition liner segments circumferentially arranged about said machine axis at a transition between said first zone and said second zone; whereby each of said transition liner segments comprises, with respect to the axial hot gas flow, a leading edge, a trailing edge, and two sidewalls, the sidewalls defining cooling holes therethrough; whereby adjacent transition liner segments define a first gap therebetween, the first gap being in fluid communication with said cooling holes; whereby each said transition liner segment is provided with axially oriented hooks at said leading and trailing edges; and whereby local spacer ribs are provided at said leading edge of each said transition liner segment to establish a second gap of minimum width between each said transition liner segment and a respective upstream segment of said segmented outer liner or said segmented inner liner.

2. The combustion chamber as claimed in claim 1, wherein said axially oriented hooks secure each said transition liner segment in respective carriers provided radially outward of said transition liner segments, said carriers and said axially oriented hooks being configured to provide a sliding interface therebetween.

3. The combustion chamber as claimed in claim 1, wherein said leading edge and trailing edge of each said transition liner segment are designed such that a purge air flow from the respective upstream segment of said segmented inner liner or said segmented outer liner is directed onto an area of each said transition liner segment to be cooled.

4. The combustion chamber as claimed in claim 1, wherein each said transition liner segment is provided with an impingement sheet, each said impingement sheet being mounted radially outward of each said transition liner segment.

5. The combustion chamber as claimed in claim 4, wherein each said impingement sheet is provided with a plurality of impingement holes having a diameter and distributed in a predetermined pattern over said impingement sheet, whereby each said impingement sheet is mounted parallel to each said transition liner segment at a predetermined distance.

6. The combustion chamber as claimed in claim 5, wherein each said transition liner segment is provided with effusion cooling holes therethrough for cooling a hot gas side of said transition liner segment, and wherein the pattern and the diameter of said impingement holes in said impingement sheet is correlated with the effusion cooling holes on said hot gas side of said transition liner segment such that with increasing impact of an effusion cooling film on said hot gas side of said transition liner segment the diameter of the impingement holes decreases and a distribution density of the pattern of said impingement holes decreases.

7. The combustion chamber as claimed in claim 6, wherein said effusion cooling holes are distributed in a predetermined pattern over said hot gas side of said transition liner segment.

8. The combustion chamber as claimed in claim 7, wherein said effusion cooling holes on said hot gas side of said transition liner segment have various orientations along a longitudinal and transverse axis of said transition liner segment.

9. The combustion chamber as claimed in claim 1, wherein a surface of said transition liner segment is coated with a thermal barrier coating (TBC), said surface being a hot gas side exposed to the axial flow of hot gases.

10. A gas turbine, comprising a compressor, a combustor with an annular combustion chamber with a plurality of burners, and a turbine section, wherein said annular combustion chamber is a combustion chamber in accordance with claim 1.

* * * * *